June 5, 1962

J. A. JACKSON ETAL 3,037,482

PORTABLE STOCK CHUTE HAVING COMBINED
CHASSIS AND HEAD-GATE FRAME

Filed Jan. 2, 1959

INVENTORS:
JONAS ASA JACKSON &
RALPH JAMES WILLIAMS

BY Ralph F. Staubly

ATTORNEY

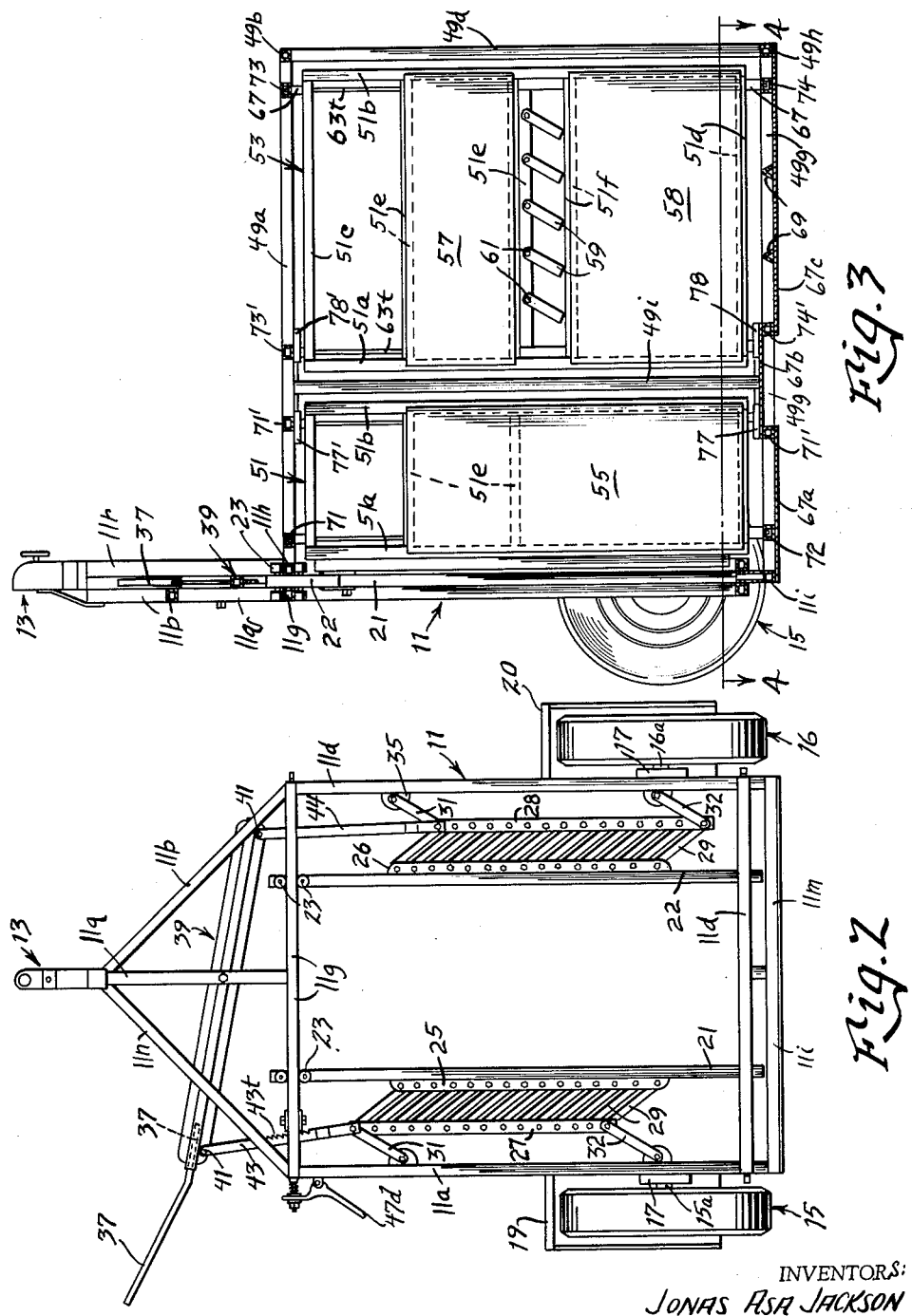
INVENTORS:
JONAS ASA JACKSON &
RALPH JAMES WILLIAMS
BY Ralph P. Staubly
ATTORNEY June 5, 1962  J. A. JACKSON ETAL  3,037,482
PORTABLE STOCK CHUTE HAVING COMBINED
CHASSIS AND HEAD-GATE FRAME
Filed Jan. 2, 1959  3 Sheets-Sheet 3
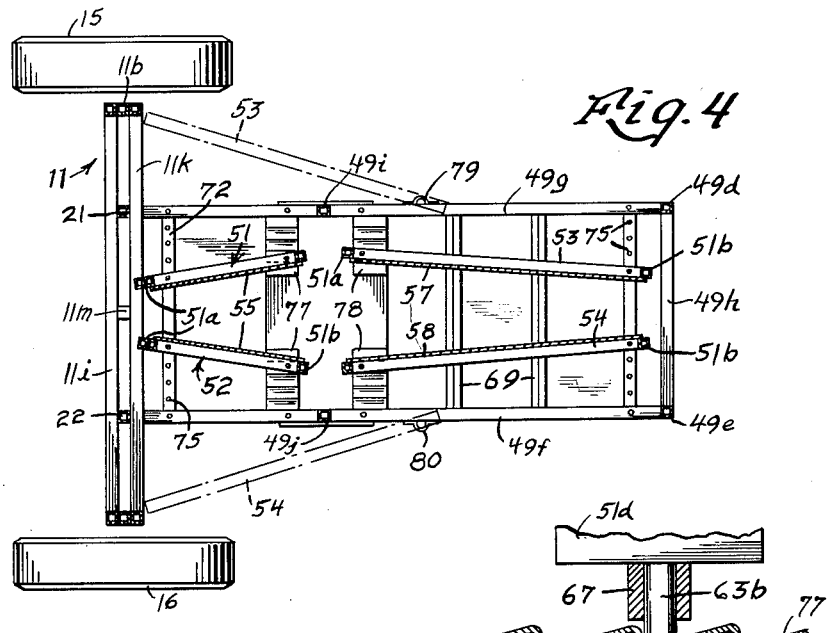
Fig. 4
Fig. 5
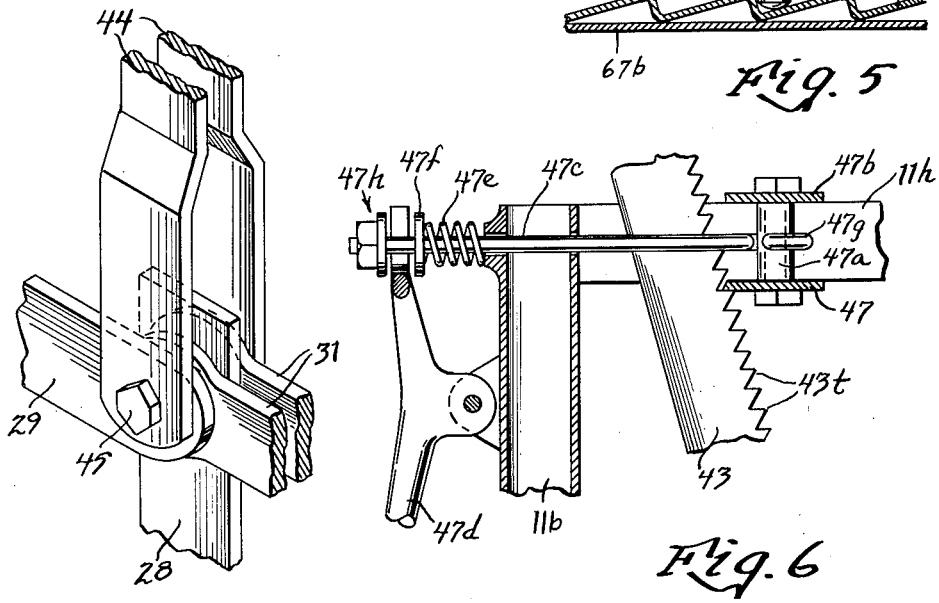
Fig. 7
Fig. 6
INVENTORS:
JONAS ASA JACKSON &
RALPH JAMES WILLIAMS
BY Ralph F. Staubly
ATTORNEY 3,037,482
PORTABLE STOCK CHUTE HAVING COMBINED
CHASSIS AND HEAD-GATE FRAME
Jonas Asa Jackson, Box 217, and Ralph James Williams,
Box 214, both of Lebanon, Tenn.
Filed Jan. 2, 1959, Ser. No. 784,708
11 Claims. (Cl. 119—99)

This invention pertains to a portable or trailer-type stock chute having a combined towing chassis and head-gate frame.

More particularly the invention pertains to a stock chute having a combined chassis and head-gate frame and arranged for being up-ended for towing onto pneumatic-tired wheels that are above ground level in use position of the chute, said head gate comprising neck-squeezing bars moved in constant parallelism by linkage systems parts of which define gate members and parts of which include a rocker bar with a removable lever handle and a ratchet for releasably holding said rocker bar in any neck-squeezing position to which it is moved, the cage portion of said chute having a plurality of side-door panels removable for quick and easy access to all parts of the animal held therein, said panels including spring-pressed hinge pins engageable into sockets in upper and lower transverse members for adjustment to animals of different sizes, said chute also having ratchet members engageable by certain of said hinge pins for holding said panels in any animal-restraining positions to which they may be inwardly swung, certain of said panels further having longitudinally extending slots to receive a transversely extending pole for forcing and holding an animal forwardly, detents for preventing reverse movement of said pole in said slots, and a towing hitch attached to said combined gate frame and chassis above the former so as to be forwardly of the latter after up-ending for transporting.

It is the principal object of this invention to provide a simple, sturdy, relatively inexpensive stock chute, that is easy to transport by merely up-ending on fixed-axle wheels and that is extremely simple, versatile and effective in operations on and handling of animals of widely varying sizes and shapes.

In the drawings:

FIG. 2 is a front elevational view of the showing of FIG. 1.

FIG. 3 is a side elevational view of the chute in vertical longitudinal section taken on the staggered line 3—3 of FIG. 1.

FIG. 4 is a plan view of the apparatus in section taken on the line 4—4 of FIG. 3.

FIG. 5 is an enlarged fragmentary elevational view of one of the head-gate-positioning ratchets.

FIG. 6 is an enlarged fragmentary elevational view of the neck-yoke-locking ratchet mechanism.

FIG. 7 is an enlarged fragmentary perspective view of the right head-gate-operating linkage.

Figure 1:
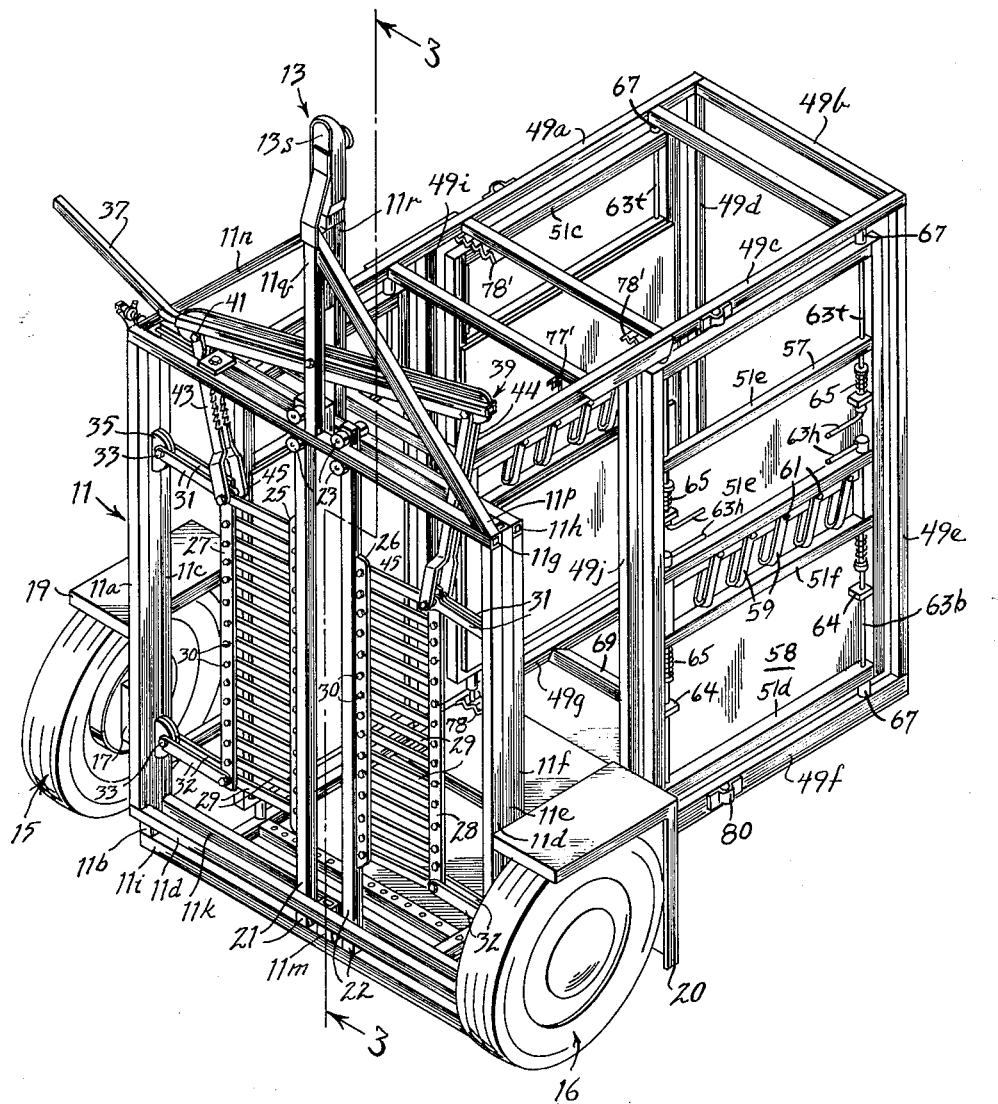
FIG. 1 is a perspective view of a preferred embodiment of the invention.

With reference now to the drawings, the numeral 11 generally designates the combined chassis and frame for the head gate. Frame 11 may conveniently be formed of sections of square steel tubing 11a—11r welded together as a rigid unit, as best seen in FIGS. 1 and 2. To the apex of the triangular frame extension formed by elements 11n—11r, is welded a trailer hitch generally designated 13 and of conventional construction. The socket 13s of hitch 13 drops over a ball of the tractor-attached portion (not shown) of the hitch 13 when the apparatus of FIGS. 1 and 3 is tilted thru 90° to the left so as to up-end the apparatus and bring the same in position for being towed on its two pneumatic-tired wheels 15 and 16 mounted on axles 15a and 16a (FIG. 2) and rigidly attached to the plates 17. Plates 17 are welded to the side members of the combined chassis and head-gate frame 11. Since the axles 15a and 16a are unsprung it is desirable that the tires of wheels 15 and 16 should be oversized so as to be inflatable at a fraction of their recommended pressure and thus protect the apparatus from road shock. The wheels are desirably covered by the sheet-metal fenders 19 and 20 shaped as shown and fastened by any suitable conventional means (welding) to the apparatus frame.

The combined head gate and stanchion comprises a pair of vertically and parallelly extending neck-squeezing square tubes 21 and 22, guided in their lateral movements at their bottoms between the spaced bottom tubes 11i and 11k and at their tops by spaced top tubes 11g and 11h. The upper ends of neck-squeezing bars 21 and 22 are held against vertical movement by the sets of low-friction rollers 23. Bars 21 and 22 are moved toward and away from each other, while held constantly parallel, by the combined gate-forming and linkage system next to be described.

The gate and stanchion-operating structures comprise a pair of flat metallic bars 25 and 26 welded to the outer faces of the neck-squeezing bars 21 and 22. Bars 25 and 26 are connected respectively to parallel floating bars 27 and 28 (of similar size and shape) by a plurality of gate-defining flat metallic bars 29 attached at their ends by pivot-forming bolts 30 to the vertical bars 25—28. The upper and lower ends of the floating bars 27 and 28 are fastened to the inside faces of the vertical members of the frame 11, respectively, by the double-bar links 31 and 32, the anchored ends of which are pivoted by bolts 33 to the welded-on lugs 35.

The combined stanchion and head gate is opened by raising the lever 37 from its position of FIG. 1 to its position of FIG. 2. Lever 37 is removably slid into the hollow of the square tube forming the basic (central) element of the rocker bar 39. The lower welded-on web of rocker bar 39 is apertured adjacent each end to receive pivot-pin bolts 41 by which the double-bar links 43 and 44 are operatively connected by pivot bolts 45 to the upper ends respectively of the vertical gate bars 27 and 28, the former being raised and the latter being depressed by said links during the opening movement. A downward pull on the lever 37 closes the head gate and moves the neck-squeezing bars 21 and 22 toward their extreme (dead-center) positions of FIG. 1. Link 43 is desirably provided with ratchet teeth 43t (FIG. 6) designed to cam past the ratchet plate 47 which will hold link 43 in any depressed position to which it is forced by the downward pull on lever 37 to thus maintain the bars 21 and 22 in neck-squeezing positions for firm holding of the animal being treated. Ratchet plate 47 slides back and forth on the lower surfaces of the top frame elements 11g and 11h, being held in sliding position by the vertical rod 47a passing thru apertures in ratchet plate 47 and a parallel guide plate 47b. The slide element 47—47b is reciprocated by the push-rod 47c moved to unlatching position by the manually operable rocker lever 47d, and normally held in latching position by the spring 47e engaging the washer 47f welded to the push-rod 47c. Rod 47c has an eye 47g engaging around post 47a, and a flanged washer 47h at its other end operatively engageable with the upper bifurcated end of the lever 47d.

The chute portion of the apparatus comprises a rectangular parallelepiped frame also formed of square tube sections 49a—j welded into a rigid structure. The front ends of longitudinally extending elements 49a, 49c, 49f and 49g are abutted against and welded to the chassis frame 11. Vertical chute-frame elements 49i and 49j further strengthen the frame but more importantly define door frames for the hinged side doors or panels, next described, which serve both as movable doors permitting quick and easy access by the veterinarian to various parts of the animal and also as movement-restraining body-squeezing panels, the same being widely adjustable, as will hereinafter appear.

The front or shoulder-engaging panels 51 and 52 are narrower than the rear flank-engaging panels 53 and 54. (The near front panel in FIG. 1 has been omitted to clarify the showing.) Each of panels 51—54 comprises a pair of side frame elements 51a and 51b and top and bottom elements 57c and 57d, welded together at their junctions. Each panel frame also has one or more horizontal medially located bracing bars 57e and 57f. Front panels 51 and 52 are covered by sheet-metal plates 55 of desired heights, while rear panels 53 and 54 are covered by pairs of plates 57 and 58 leaving horizontally extending narrow openings between the bracing elements 51e and 51f, thru which openings a rump-engaging pole (not shown) can be passed to prod and hold the animal being treated forwardly. The pole is held in adjusted forward position by the series of detents 59 which are hair-pin-shaped metal straps slightly longer than the height of the space between elements 51e and 51f and pivotally swung from the upper element 51e by pivot bolts 61, so that the pole can cam under and lift the detents 59 sequentially as it is moved forwardly, each detent dropping by gravity behind the pole to prevent its being pushed backwardly by the animal.

Each side panel is provided with pairs of retractable hinge pins 63t (top) and 63b (bottom). Hinge pins 63t and 63b are guided by apertures in the horizontal panel frame elements and by welded-on guide lugs 64 which also serve as abutments for compression springs 65, which normally hold the hinge pins in extended positions entering bearing sleeves 67 welded to the panel frame elements. The adjacent ends of the rods constituting the hinge pins are bent horizontally to form handles which can be simultaneously (or separately) manually gripped and moved toward each other to disengage the hinge pins for removal or for adjustment of the doors inwardly to restrainingly squeeze the enclosed animal. The floor of the cage is herein shown as being one or more panels of sheet metal 67a–c, cross-braced by combined strengtheners and anti-slip tread-forming angle bars 69.

As best shown in FIGS. 4 and 5, the panels are made adjustable as to location of their hinge axes by the top and bottom transverse bars 71 and 72 (front) and 73 and 74 (rear), each provided with a series of hinge-pin-receiving alined apertures 75. To the floor panels are fastened (welded) undulated ratchet-forming plates 77 and 78 over which the centrally located hinge pins will cam when the panels are pushed inwardly against the animal (steer, cow, boar, sow, sheep, etc.) being squeezingly restrained. The saw-teeth of the ratchet plates 77 and 78 act as detents to prevent outward movement of the panels until the pins are manually retracted by the operator. Similar ratchet plates 77' and 78' are attached to the upper centrally located transverse bars, as shown.

To lower the center of gravity of the structure during towing, pairs of omega-shaped straps 79 and 80 are welded to each side of the chute proper to receive the hinge pins of the rear door panels 53 and 54 to hold them in their phantom-shown positions of FIG. 4.

While we have shown certain preferred embodiments of our invention, it is to be understood that many changes can be made in the size, shape, composition and arrangement of the parts without departing from the spirit of the invention as defined by the subjoined claims.

Having thus described our invention, we claim:

1. An animal chute comprising: a rigid body frame having ends, sides and a floor defining an elongated chute stall, adjustably movable door panels attached to the sides of said stall for providing quick and easy access to various parts of an animal held therein and also to serve as body-engaging movement-restraining members, a vertically disposed head-gate frame including a bottom means connected to the front end of said body frame with the head-gate frame bottom means positioned adjacent said floor, the head-gate frame having a rigid medially disposed upward extension portion, a pair of relatively movable neck-squeezing bars attached to and mounted for movement within said head-gate frame, linkage means connecting said bars to said head-gate frame for relatively moving said bars, a lever connected to said head-gate frame extension portion and to said linkage means for operating said linkage means, a pair of wheels, one on each side of said head-gate frame and adjacent said body frame floor, hub shafts horizontally and outwardly extending from said head-gate frame in the plane thereof connecting said wheels to said head-gate frame and positioned thereon at a distance from said body frame floor greater than the radius of said wheels whereby said wheels clear the ground when said chute floor is on the ground in use position and protrude forwardly of said head-gate frame sufficiently to provide adequate road clearance when said chute is up-ended with said head-gate frame horizontally disposed to serve as a chassis for said chute during towing thereof, and towing-hitch means fixed to the upper portion of said head-gate frame.

2. Structure according to claim 1, said linkage means including ratchet elements and a quickly releasable pawl means normally biased to latch said linkage means in any neck-squeezing positions to which moved.

3. Structure according to claim 1, said linkage means including gate members formed of sets of parallel link-type bars moving and guiding said neck-squeezing bars and connected to a rocker bar for opposite up and down movements during opening or closing movements of the head gate defined by said bars.

4. Structure according to claim 1, said door panels including retractable hinge pins engageable into various sockets in said body frame for wide adjustment to animals of various sizes.

5. Structure according to claim 4 and additionally comprising ratchet-type elements engageable by certain of said hinge pins so that said panels can be pushed into body-restraining positions to be held therein by said ratchet-type elements.

6. Structure according to claim 1, certain of said door pins having springs normally holding the same in extended positions, and handle elements for manually pulling said pins into positions permitting adjustments of said doors.

7. Structure according to claim 1, certain of said doors having horizontally and longitudinally disposed slots therein to permit insertion of an animal moving and holding pole transversely of said stall, and detent fingers extending into said slots so as to permit forward but prevent rearward movement of said pole in said slots.

8. Structure according to claim 1 and additionally comprising means for quickly and easily attaching certain of said door panels to said chute so as to lower the center of gravity thereon during towing.

9. Structure according to claim 8, said last-mentioned means comprising socket elements adapted to receive retractable door-hinging pins and located so as to mount said doors in leaning positions engaging both said body frame and said combined head-gate frame and chassis.

10. Structure according to claim 1, said chute having a floor portion having at least one depressed centrally located area to serve as a reservoir for medicinal solutions, said floor and reservoir being substantially selfcleaning as a result of their vertical disposition and road-shock vibration when said chute is up-ended for transporting.

11. Structure according to claim 1, said chassis and gate frame being sufficiently wider than the chute proper so that said gate can be opened wide enough to be substantially unobservable to an entering animal thereby removing the psychological barrier that observable passageway constrictions tend to induce.

References Cited in the file of this patent

UNITED STATES PATENTS

| | | |
|---|---|---|
| 2,576,654 | Thorson | Nov. 27, 1951 |
| 2,593,559 | Hildenbrand | Apr. 22, 1952 |
| 2,600,602 | Abildgaard | June 17, 1952 |
| 2,678,631 | Hagar | May 18, 1954 |
| 2,703,554 | Haggard et al. | Mar. 8, 1955 |
| 2,713,326 | Stephenson | July 19, 1955 |
| 2,764,129 | Haggard | Sept. 25, 1956 |